United States Patent Office 3,522,018
Patented July 28, 1970

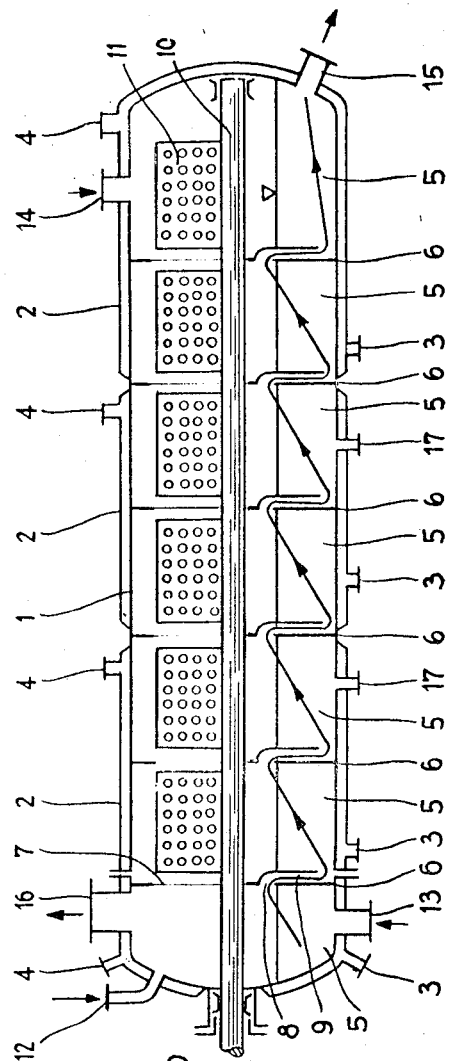
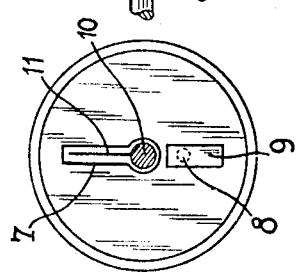
Ditmar Bachmann
Karlheinz Grafen
Wolfgang Fischer
Armin Schubring
INVENTORS

3,522,018
APPARATUS FOR THE CONTINUOUS PREPARATION OF BIS-2-HYDROXY-ETHYL PHTHALATES
Ditmar Bachmann, Hofheim, Taunus, Karl Heinz Grafen, Offenbach am Main, and Wolfgang Fischer and Armin Schubring, Frankfurt am Main, Germany, assignors to Farbwerke Hoechst Aktiengesellschaft vormals Meister Lucius & Bruning, Frankfurt am Main, Germany, a corporation of Germany
Original application Mar. 22, 1965, Ser. No. 441,471. Divided and this application Sept. 15, 1967, Ser. No. 671,533
Claims priority, application Germany, May 2, 1964, F 42,776
Int. Cl. B01j *3/00;* C07c *69/82*
U.S. Cl. 23—285    3 Claims

ABSTRACT OF THE DISCLOSURE

A horizontally disposed cylindrical casing in which a liquid can be reacted with a vapor is subdivided into a plurality of baffle chambers communicating with one another above the liquid level for passage of vapors and below the liquid level for movement of liquid from one chamber to the next. The chambers may be provided with individual heating means, for maximum temperature control and with a stirring device. The apparatus is particularly adapted for reacting dimethyl terephthalate or the like with ethylene glycol in several stages.

---

This application is a division of application Ser. No. 441,471 filed Mar. 22, 1965, now U.S. Pat. No. 3,373,186 granted Mar. 12, 1968.

The present invention relates to a process and an apparatus for the continuous preparation of bis-2-hydroxyethyl phthalates. In particular it relates to an improvement in the continuous preparation of bis-2-hydroxyethyl phthalates.

By bis-2-hydroxyethyl phthalates are here to be understood bis-2-hydroxyethyl terephthalate, bis-2-hydroxyethyl isophthalate and mixtures thereof.

It is known to prepare bis-2-hydroxyethyl terephthalate, bis-2-hydroxyethylisophthalate or mixtures of bis-2-hydroxyethyl terephathalate and bis-2-hydroxyethyl isophthalate or their polymers of low molecular weight by reacting dimethyl terephthalate, dimethyl isophthalate or a mixture of dimethyl terephthalate and dimethyl isophthalate with ethylene glycol in the presence of a reesterification catalyst under atmospheric or superatmospheric pressure at temperatures rising from 150° to 240° C. in the direction in which the reaction proceeds, in a heated reesterification apparatus subdivided into a plurality of parts in which the different stages of the process take place and into which apparatus ethylene glycol and dimethyl terephthalate and/or dimethyl isophthalate are continuously introduced and from which the vapours that form the bis-2-hydroxyethyl terephthalate and/or bis-2-hydroxyethyl isophthalate that form are continuously drawn off. In that known process the vapours of methanol, ethylene glycol and by-products which form in each reaction stage as the esterification proceeds are immediately drawn off together from the part of the apparatus in which they have formed and additional quantities of ethylene glycol are introduced into one or several parts of the apparatus.

There is also known an apparatus for carrying out the aforesaid process, which comprises a casing which preferably is cylindrical, which can be heated on all sides, which preferably is arranged horizontally and which is subdivided into a plurality of baffle chambers by means of baffle elements.

Now we have found that the aforesaid known process can be improved by drawing off the vapours of methanol and by-products that form from the liquid reaction mixture in such a manner that a subsequent mixing is avoided to a large extent.

The improvement according to the invention consists in conducting a gas that is inert towards the reaction, for example, nitrogen, in countercurrent to the liquid reaction mixture, this gas being used in such an amount that the speeds at which the vapours flow in the free spaces between the vapour chambers of the individual reaction stages are higher than the speed at which the vapours diffuse into the inert gas.

The inert gas reduces the partial pressures of the vapours that are present over the liquid mixture, so that they can leave the liquid more easily. Moreover, by the increased speed of flow which is brought about by the inert gas that is conducted in countercurrent to the liquid reaction mixture, the vapours coming from stages of a high vapour concentration are prevented from penetrating into stages having a lower vapour concentration. Besides, by the said measure the vapours are prevented from mixing again with the liquid.

The quantity of vapour leaving the liquid is further increased when the liquid reaction mixture is additionally moved in the individual reacton stages by stirring. As for the rest it is advantageous to carry out the process under the physical conditions applied in the above-mentioned known process, namely under a pressure of 1 to 4 atmospheres (absolute) and at a temperature within the range of 150° to 240° C. The process may also be carried out under reduced pressure. The temperature may be gradually increased in the different stages, advantageously in the direction in which the reaction proceeds.

For carrying out the process according to the invention the reactor which consists of a cylindrical casing which may be heated on all sides and which preferably is arranged horizontally, is designed in such a manner that the individual baffle chambers are separated from one another by disk-shaped baffle elements which in their parts projecting into the gas chambers are provided with slit-shaped openings through which the mixture of gas and vapour can pass and which at the height of the level of the liquid have an opening followed by a syphon, an immersion tube or the like which ends at a place below the liquid level of the following chamber.

It is also advantageous to provide the reactor with a stirring device having perforated blades fixed to a horizontal shaft, the dimensions of the stirrer being such that it can be introduced through the slits of the baffle elements.

The reactor according to the invention will now be described in greater detail by way of example only with reference to the accompanying drawing in which: FIG. 1 is a sectional elevation of the reactor and FIG. 2 is a top view of a baffle element, the baffle element being shown from the side at which the immersion tube is arranged.

Referring to the drawing, FIG. 1 shows a reaction casing 1 which is surrounded by a subdivided heating jacket 2 containing pipes 3 and 4, pipe 3 serving to supply the heating agent and pipe 4 serving to remove it. The reactor is subdivided into a plurality of baffle chambers 5. The chambers are separated from one another by disk-shaped baffle elements 6 which in their parts projecting into the gas chambers are provided with slit-shaped openings 7. The liquid chambers are connected with one another via openings 8 and syphon 9. The stirring device comprises a shaft 10 which is provided with perforated blades 11. The shape and dimensions of the slit-shaped openings 7 are such that stirrer shaft 10 and flat blades 11 can be pushed through them when the stirring device is mounted.

Pipe 12 serves for the introduction of ethylene glycol in which the catalyst for the reesterification is dissolved. Via pipe 13 dimethyl terephthalate, dimethyl isophthalate or a mixture thereof can be introduced. Pipe 14 is connected with an inert gas net or an inert gas container. Reference numeral 15 designates a pipe serving to remove the liquid reaction product. Pipe 16 is connected with a reflux condenser (not shown in the drawing) which is heated with warm water and a stripper of known type. Pipes 17 can be provided with accessories serving for sample taking. Pipes 17 may also be used for modifying the composition of the mixture, if desired or required.

After the reactor has been heated to the required temperature the reaction components are introduced in continuous streams via pipes 12 and 13 and the inert gas is introduced in a continuous stream via pipe 14. Simultaneously the stirring device is set to work. The methanol and ethlyene glycol which form during the esterification and gaseous by-products which may have been expelled together with the methanol and ethylene glycol are removed by the inert gas via slits 7 of baffle elements 6 and pipe 16. In the reflux condenser connected with pipe 16 the main quantity of the ethylene glycol that has been entrained is condensed. It flows back to the reactor and if any dimethyl terephthalate has sublimated it is swept back together with the condensed ethylene glycol that flows back. The pressure in the reactor can be adjusted in known manner, for example, by means of throttling devices arranged behind the reflux condenser. The methanol is expelled in the vaporous state and it can be liquefied in known manner behind the ethylene glycol condenser.

The following examples serve to illustrate the invention but they are not intended to limit it thereto.

EXAMPLE 1

Bis-2-hydroxyethyl phthalate was prepared in a reactor of the type described above which had an inside diameter of 150 mm. and a length of 2000 mm. and which comprised 12 chambers and a stirring means. The reactor had three separate heating jackets. The horizontal stirring shaft which passed through the whole length of the apparatus was provided with 11 perforated blades which were driven at a speed of 90 revolutions per minute.

After the reactor had been heated 5 kilograms of dimethyl terephthalate having a temperature of 170° C. and 3.67 kilograms of ethylene glycol which had a temperature of 20° C. and in which 4.5 grams of calcium acetate were dissolved were introduced per hour into the first chamber of the reactor. 200 liters of nitrogen were introduced per hour into the last chamber of the reactor. The temperature in the reactor raised from 170° C. in the first chamber to 205° C. in the last chamber. 6.54 kilograms of the bis-2-hydroxyethyl terephthalate were discharged per hour together with 0.378 kilogram ethylene glycol and catalyst. 1.648 kilograms of methanol and in addition thereto ethylene glycol, the nitrogen used and traces of by-products left the apparatus through the device for the removal of the vapours, the main portion of the vaporous ethylene glycol that had left the apparatus flowed back to the reactor in the liquid state. The methanol was drawn off whereby 0.104 kilogram per hour of ethylene glycol was also entrained. The time of stay, calculated on the total quantity of the substances used, was 1.35 hours.

EXAMPLE 2

6 kilograms of dimethyl terephthalate and 4.404 kilograms of ethylene glycol were introduced per hour into the first chamber of the reactor used in Example 1. In the ethylene glycol, 1.08 kilograms of zinc acetate were dissolved. 260 liters per hour of nitrogen were introduced into the last chamber. The temperature in the reactor was adjusted in such a manner that it rose from 165° C. in the first chamber to 203° C. in the last chamber. 7.860 kilograms of the bis-2-hydroxyethyl terephthalate were discharged per hour together with 0.439 kilogram of ethylene glycol and catalyst. 1.977 kilograms of methanol and, in addition thereto, ethylene glycol and insignificant portions of by-products left the reactor per hour through the device for drawing off the vapours. The main portion of ethylene glycol flowed back to the reactor in the form of a condensate. 0.128 kilogram per hour of ethylene glycol passed over together with the methanol that was expelled.

The time of stay, calculated on the total quantity of the substances used, was 1.13 hours.

We claim:

1. In apparatus for reacting a liquid with a vapor comprising a horizontally disposed cylindrical casing, inlet means for said liquid and vapor reactants at one end thereof and outlet means at the other end for maintaining a preselected level of liquid within said casing, means for heating said casing on all sides, and substantially vertical, disk-shaped baffle elements subdividing the cylindrical casing into a plurality of baffle chambers, the improvement which comprises inlet means in the upper portion of said casing at said other end for introducing a counter-current movement of an inert gas, a slit-shaped opening in the upper portion of each baffle element for passage of gases therethrough, and a conduit in the lower portion of each baffle element, said conduit forming a syphon having an inlet opening in the baffle element at the preselected liquid level communicating with one adjoining baffle chamber and an outlet opening in the next adjoining baffle chamber at a lower level for moving liquid from the surface thereof in one chamber to the next chamber toward said outlet means.

2. Apparatus as defined in claim 1 wherein the means for heating the casing is subdivided into separate heating means, one for each of the baffle chambers, for individual temperature control in each chamber.

3. Apparatus as defined in claim 1 wherein the slit-shaped openings in the baffle elements are in alignment with one another to facilitate insertion of an axial shaft provided with stirring blades likewise in alignment with one another.

References Cited

UNITED STATES PATENTS

| 2,760,850 | 8/1956 | Lambert et al. | 23—285 |
| 3,251,657 | 5/1966 | Bachmann et al. | 23—285 |

JAMES H. TAYMAN, JR., Primary Examiner

U.S. Cl. X.R.

260—475; 261—75, 92, 125, 148